United States Patent [19]

MacMillan

[11] 3,998,276
[45] Dec. 21, 1976

[54] PLOW AND EARTH FRAGMENTATION MACHINE

[76] Inventor: Douglas M. MacMillan, 710 Chemeketa Drive, San Jose, Calif. 95123

[22] Filed: Nov. 4, 1974

[21] Appl. No.: 520,196

[52] U.S. Cl. .................................. 172/67; 172/40; 172/70; 172/112; 172/123; 172/240; 172/261; 172/271

[51] Int. Cl.² ................. A01B 49/02; A01B 33/02; A01B 61/00; A01B 63/10

[58] Field of Search ............... 172/32, 33, 39, 40, 172/63, 65, 66, 67, 70, 71, 72, 103, 112, 118, 119, 123, 145, 146, 149, 150, 170, 189, 195, 196, 198, 199, 240, 261, 271, 413, 463, 464, 491, 519, 537, 540, 541, 543, 544, 548, 554, 611, 612, 663, 668, 699, 700, 720; 404/90, 91, 130

[56] References Cited

UNITED STATES PATENTS

| | | | |
|---|---|---|---|
| 704,822 | 7/1902 | Gooing | 172/544 |
| 1,623,149 | 4/1927 | Wilson | 172/271 X |
| 1,662,052 | 3/1928 | Bullock | 172/543 |
| 1,944,937 | 1/1934 | Kelsey | 172/544 |
| 2,637,259 | 5/1953 | Acton | 172/413 UX |
| 2,783,698 | 3/1957 | Bambi | 172/32 |
| 2,788,725 | 4/1957 | Wilkey et al. | 172/33 |
| 2,950,566 | 8/1960 | Henry | 172/67 X |
| 3,008,389 | 11/1961 | Hicks | 404/130 |
| 3,367,293 | 2/1968 | Cox | 172/71 X |
| 3,448,814 | 6/1969 | Bentley et al. | 172/146 |
| 3,502,152 | 3/1970 | Johnson | 172/40 |
| 3,570,604 | 3/1971 | Allard et al. | 172/240 X |
| 3,661,213 | 5/1972 | Taylor | 172/72 |
| 3,752,092 | 8/1973 | Vinyard | 172/261 X |
| 3,818,269 | 12/1957 | Northcote et al. | 172/413 X |

Primary Examiner—Richard T. Stouffer
Attorney, Agent, or Firm—Townsend and Townsend

[57] ABSTRACT

This invention relates to earth processing equipment and, more particularly, to a scarifier or plow apparatus capable of deep soil penetration which has an attached earth fragmentation assembly. The apparatus comprises a frame mounting on its forward end, a scarifier assembly which is adjustable from the frame to provide varying soil penetration. An earth fragmentation assembly is permanently affixed to the frame immediately behind the scarifier and comprises a scoop bucket with internal, shaft-mounted rotatable arms or cudgelers for fragmentizing earth passing interiorly of the fragmentation assembly and with a fixed bottom support for the soil within the scoop bucket. This apparatus is particularly useful for the single pass processing of compacted agricultural beds.

2 Claims, 4 Drawing Figures

PLOW AND EARTH FRAGMENTATION MACHINE

The increased mechanization of farm machinery has resulted in numerous heavy pieces of equipment being successively towed and passed over agricultural land. This repeated passing of weighted equipment, while reducing the manual labor necessary to attend agricultural production, has the undesirable side effect of packing and compacting the soil into a hard impermeable mass. Agricultural soil beds so compacted have poor drainage, resist the addition of needed soil additives, such as fertilizer and the like, and are incapable of being adequately aerated. Such inadequate aeration prevents gases of decomposition from escaping the soil bed, and further arrests the entry of an adequate oxygen supply for necessary organic decomposition. To alleviate this condition, it has been customary in the past to plow such beds. This expedient, however, produces large, firmly compacted soil clods which retain the undesirable characteristics of the original compacted soil bed and readily revert back to their unplowed state. Accordingly, the present invention provides a single pass plow and earth fragmentation assembly which disengages the compacted soil bed, fragmentizes the soil in an exposed and elevated position from the surrounding earth and replaces the processed ground in a level, homogenous soil bed suitable for immediate planting. The processed soil is aerated during the fragmentation operation and discharged from the disclosed apparatus in a state where the natural organic cycle of decomposition and growth readily occurs.

An object of this invention is to provide a deep working plow and fragmentation apparatus for the single pass processing soil layers which is capable of disengaging compacted soil, processing the soil in a disposition whereby the soil is readily aerated, and replacing the processed earth in a level, mildly compacted agricultural bed suitable for immediate planting. To accomplish this purpose, a frame is provided for moving mounted earth-working assemblies in soil-engaging relationship with the soil layers to be processed. A scarifier assembly capable of relatively deep penetration is mounted in a vertically adjustable alignment to the frame for disengaging the compacted layers of soil. Immediately behind the scarifier assembly there is mounted an earth fragmentation apparatus comprising a scoop bucket assembly and a cudgeler assembly. The scoop bucket assembly has an open leading portion for receiving the disengaged soil and an open trailing portion through which soil, accumulated in the interior of the scoop bucket, is discharged. The open leading portion of the scoop bucket has a moldboard attached which extends angularly forward and downward from the scoop bucket for impelling the disengaged soil interior of the scoop bucket as the frame is moved during the single pass. The cudgeler assembly is rotatably mounted interiorly of the scoop bucket extending approximately the width thereof. This assembly comprises a rotatable shaft with a plurality of short arm-like protrusions or earth cudgelers mounted on the diameter of the shaft extending radially outward therefrom. The shaft is mounted at a height from the bottom of the scoop bucket which will permit the cudgelers to contact soil passing interiorly of the scoop bucket. In operation, the shaft with its attached cudgelers is rotated as the scarifier and fragmentation assemblies are moved through the earth. The scarifier disengages the compacted soil layers in large clods. These clods are impelled into the interior of the scoop bucket by the moldboard attached to the leading portion thereof. Once in the interior of the scoop bucket, the clods are rapidly struck by the power rotated shaft with its attached cudgelers. The impact of the cudgelers in the interior of the bucket fragmentizes the soil in a displaced position where the aeration of the soil rapidly occurs. After being fragmentized, the soil is discharged from the scoop bucket through the open trailing portion and is compressed underneath a frame attached roller which compresses soil into an agricultural bed suitable for immediate planting.

A further object of this invention is to provide a deep earth-working combination plow and fragmentation apparatus which may be drawn in soil-engaging relationship through the earth with a minimum of friction. It is known in the law of physics that the static coefficient of friction exceeds the kinetic or moving coefficient. This law of friction teaches that less effort or work is required to keep two bodies, such as soil and metal, in constant motion with respect to one another than is required to constantly initiate or start the motion. The present invention applies this principle by the novel expedient of superimposing vibrational motion upon the earth-working conveyance of the disclosed apparatus. Accordingly, a vibrational generator is attached medially to the scarifier or plow assembly. Vibrational energy is transmitted from the generator to the scarifier assembly and through the frame to the earth fragmentation assembly. These assemblies have minute vibrational motion superimposed upon their earth-working conveyance through the soil layer being processed. This minute motion arrests the tendency of the soil being processed from remaining in a temporarily stationary position with respect to the working surfaces of the scarifier and fragmentation assemblies, thus, preventing friction in the static range. All working surfaces in contact with the earth remain in the more efficient kinetic or moving frictional union, thereby requiring less energy for the desired soil-engaging conveyance.

An additional object of this invention is to achieve a uniform dispersion of soil additives throughout the entire growing layer of an agricultural soil bed. This dispersion is provided by introducing soil additives to the processed earth immediately prior to the fragmentation of the soil. As the soil is fragmentized, the additive is uniformly dispersed throughout the processed earth.

Other objects, features and advantages of the present invention will be more apparent after referring to the following specification and attached drawings in which.

Figure 1:
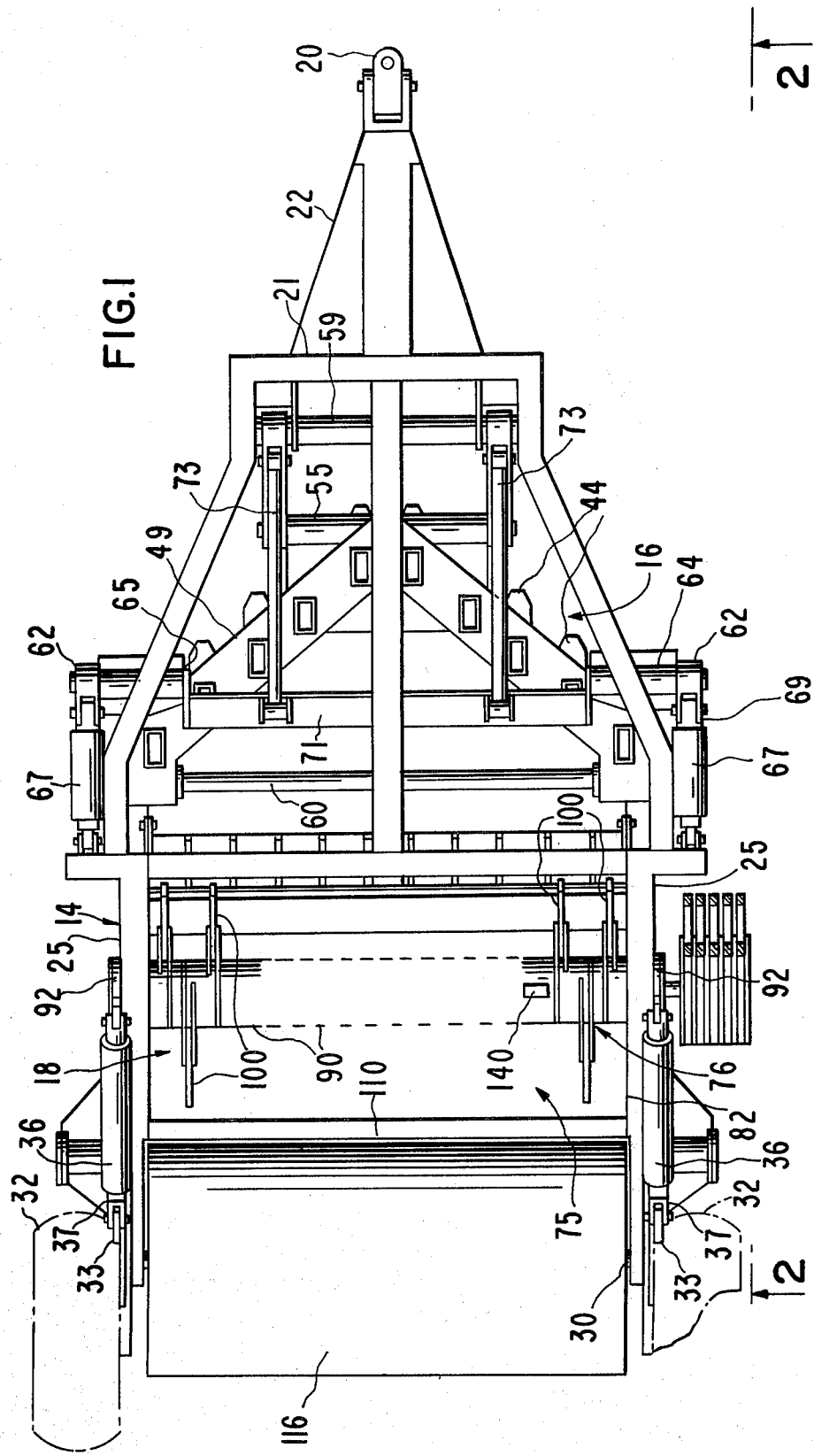
FIG. 1 is a plan view of the combination plow and earth-fragmentizing apparatus.
Figure 2:
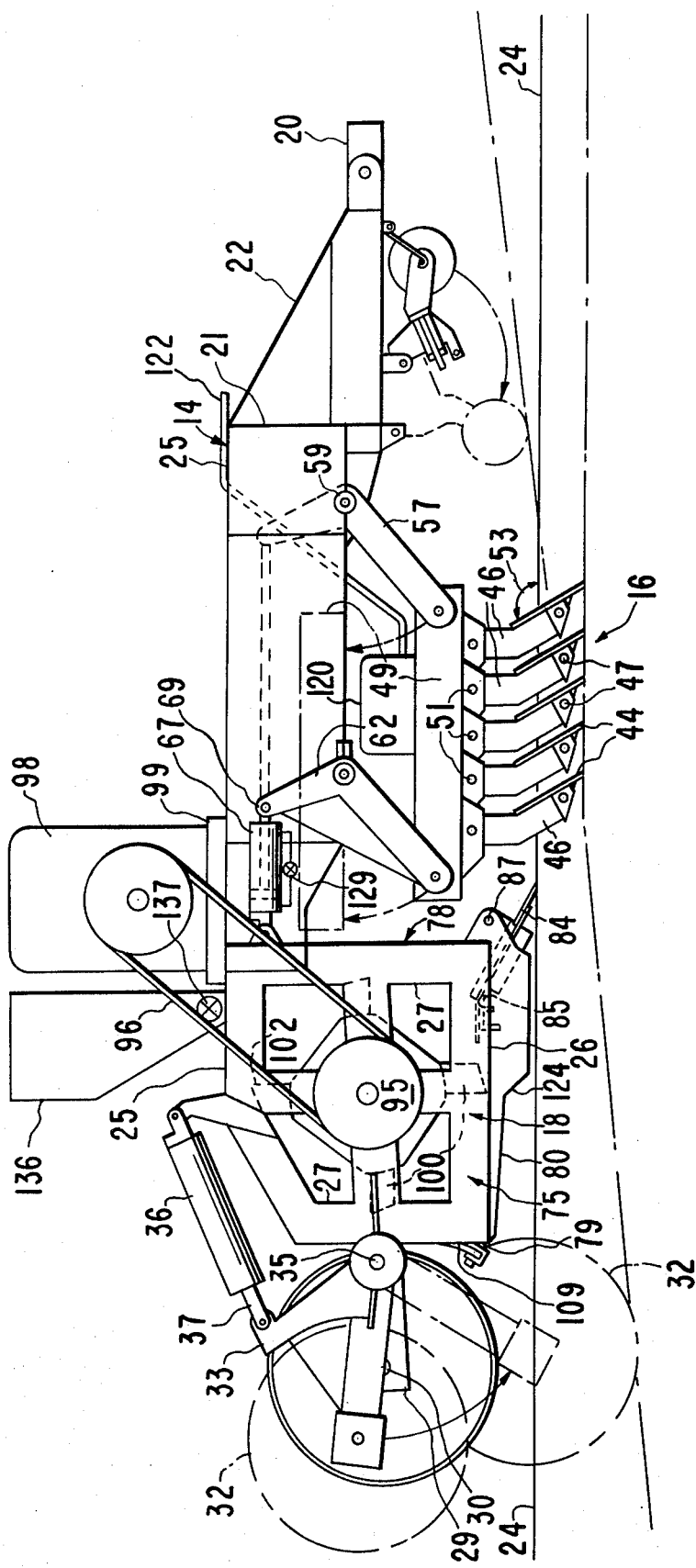
FIG. 2 is a side elevation view of the disclosed apparatus.

With reference to the attached drawings and, in particular, to FIGS. 1 and 2 thereof, a frame 14 supports scarifier assembly 16 immediately in front of earth fragmentation assembly 18. Standard towing hitch 20 is provided on the leading portion of frame 14 attaching to cross bar 21. Frame 14 immediately behind cross bar 21 extends in two angularly widening and upwardly directed channels 22 into the vicinity immediately overlying scarifier 16 at an elevation sufficient to permit the scarifier to be supported out of earth-engaging relationship with soil layer 24. Immediately rearward of scarifier 16, the frame extends at a constant width through two horizontal beams 25 into the top side portions of earth fragmentation assembly 18. The fragmentation assembly has two sides each supported by horizontal beams 25 with girders 26 attached to three vertical beams 27. Spars 29 attach medially to vertical beams 27 and extend rearward of fragmentation assembly 18 terminating frame 14 in roller pinions 30. Two ground-engaging tires 32 are rotatably mounted to frame 14 immediately behind fragmentation assembly 18. Tires 32 are connected at the lower or first end of arms 33. The arms are rotatably attached to frame 14 at their medial portion by means of pivots 35 in the end of spars 29. The upper or second end of arms 33 connects the frame 14 at beams 25 through a hydraulic tire adjustment cylinder 36 and plunger 37. As will hereinafter become apparent, tires 32 provide a convenient mode of adjustment for lifting frame 14 above the soil layer 24 for road travel.

Scarifier assembly 16 has a plurality of earth-engaging teeth 44 attached to shanks 46 by bolts 47. Shanks 46 attach at their upper extremity to scarifier yoke 49 by means of fasteners 51. Teeth 44 are affixed to the lower extremity of the shanks mounted so as to be between the shank and the advancing soil layer during the single pass. The teeth form an obtuse angle 53 with the advancing soil layer so as to disengage the compacted earth angularly upwards along their surface. As is readily apparent, both teeth 44 and shank 46 may be varied in length and configuration to provide the optimum disengagement of compacted layer 24.

Yoke draw bar 55 attached to the medial leading portion of yoke 49 extending generally parallel to yoke 49. Each end of draw bar 55 is pivotally connected to one end of forward fulcrums 57. Fulcrums 57 are medially pivoted about axles 59 attached to frame 14 immediately behind cross bar 21. Yoke bar 60 extends transversely across the rear portion of yoke 49 and is pivotally connected outside of the scarifier by two rearward fulcrums 62. Fulcrums 62 are pivotally mounted to channels 22 by bearings 64 at fulcrum axles 65. Two hydraulic scarifier pistons 67, attached to frame 14 at the leading portion of beam 25, attach at their piston end 69 to the upper extremity of fulcrum 62. Fulcrum axles 65 fixedly attached to fulcrums 62 are rotatably mounted in bearings 64. Each of the axles 65 runs the length of bearings 64 from fulcrums 62 and attaches to rod connecting bar 71. Mechanical attachments are provided from the upper extremity of forward fulcrums 57 to rod connecting bar 71 by connecting rods 73.

Scarifier 16 is adjustable with respect to soil layer 24 by means of hydraulic energy, supplied at scarifier pistons 67. In FIG. 2, scarifier 16 is shown in its maximum ground-engaging attitude. When plunger 69 moves forward, rearward fulcrum 62 rotates yoke bar 60 upwardly in an arcuate path immediately under scarifier piston 67. Simultaneous with this rotation, yoke draw bar 65 is similarly rotated by forward fulcrums 57 and their mechanical attachment to rearward fulcrums 62 through axles 59, rod connecting bar 71 and connecting rods 73. Because fulcrums 57 and 62 have arms of equal length between the point where they are mounted to the frame and their respective bars 55 and 60, the commonly attached yoke 49 is maintained parallel to the top most portion of frame 14 in all positions of elevation. By the hydraulic adjustment of plunger 69 between a position of maximum extension and maximum retraction, the penetration of teeth 44 may be varied with respect to soil layer 24.

Earth fragmentation assembly 18, located on frame 14 immediately to the rear of scarifier 16, comprises a scoop bucket assembly 75 and a cudgeler assembly 76. Scoop bucket assembly 75 is formed with an open leading portion 78 through which the disengaged soil enters the interior of scoop bucket, and an open trailing portion 79 where soil accumulated interiorly of the scoop bucket is discharged. Scoop bucket 75 is defined along its lower portion by bottom 80 connected across girders 26. Girders 26, beams 25, vertical beams 27 and the forward portion of spars 29 have attached inwardly thereto a pair of scoop walls 82. At open leading portions 78, attached to bottom 80, there is provided a moldboard 84. This moldboard extends angularly downward and forward of open leading portion 78 and impels the disengaged layers interiorly of scoop bucket 75. Moldboard 84 is adjustable about moldboard pinion 85 and moldboard clamp 87 to provide the optimum attack angle for impelling the soil interiorly of the scoop bucket. As is apparent, moldboard 84 is replaceable and may be varied in both length and configuration to attain an optimum impelling engagement.

Figure 3:
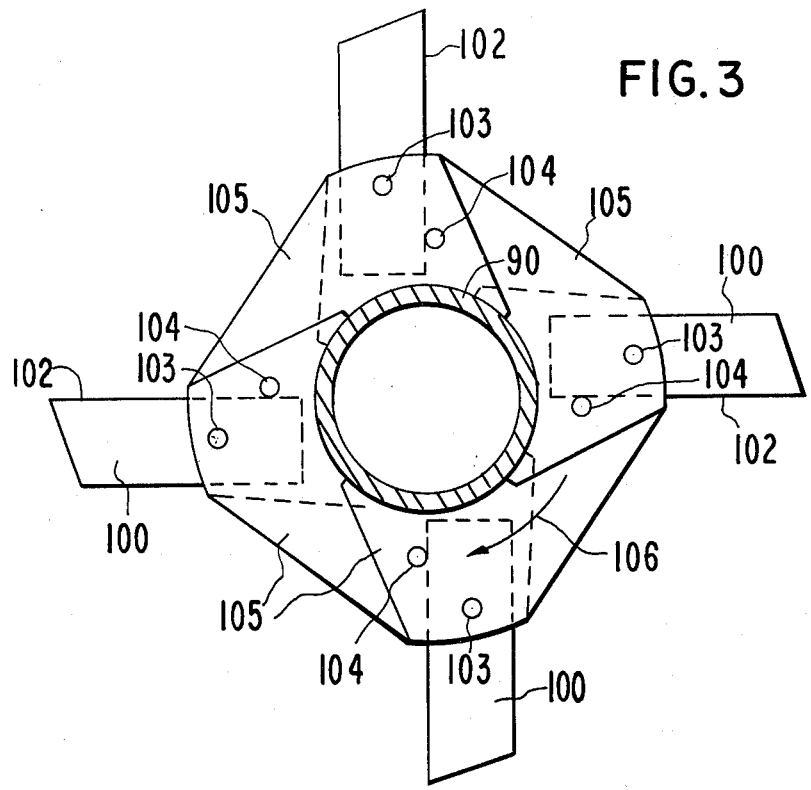
FIG. 3 is a perspective side elevation cross-section showing the earth cudgeler assembly.

Cudgeler assembly 76 comprises a rotatable shaft 90 extending the width of scoop bucket assembly 75. Rotatable shaft 90 is here shown extending through scoop walls 82 at either side of scoop bucket 75 into bearings 92 mounted on spars 29 at the intersection of middle vertical beams 26. Belt drive pulley 95 is fixedly mounted at one end of shaft 90 exteriorly of scoop bucket 75. Belts 96 connect pulley 95 to engine 98 mounted at the top portion of frame 14 on platform 99. Rotatable shaft 90 has a plurality of short arms or earth cudgelers 100 mounted radially to shaft 90 along its length interiorly of scoop bucket 75. As is shown by FIG. 3, cudgelers 100 are mounted with their leading edge 102 radially extending from the rotational axis of shaft 90. Cudgelers 100 are attached in axial rows to shaft 90 at 90° rotational intervals. As is apparent, both the number of cudgelers 100 and their rotational interval may be varied about shaft 90 to promote fragmentation of the passing soil.

Cudgelers 100 are short steel vanes or arms and as illustrated in FIG. 3 are attached to shaft 90 by means of pivot pin 103 and shear pin 104 between shaft protrusions 105 on either side thereof. In installation, the cudgeler is pivotally attached to shaft protrusions 105 by pivot pin 103. The lower leading edge of cudgeler 100 is restrained from rotational movement forward of the radial extension of the rotational axis of shaft 90. As is apparent, when the shaft is rotated in the direction of arrow 106, the upper leading edge 102 of cudgelers 100 will strike the passing soil. Upon such impact with rocks, however, shear pin 104 will be destroyed allowing the lower leading edge 102 of cudgeler 100 to rotate forward of the axis of shaft 90. This forward rotation will withdraw the upper leading edge 102 from contact with the impacted rock protecting the cudgeler from destruction. As is apparent, the cudgeler may be restored to normal operation upon the installation of a new shear pin.

Figure 4:
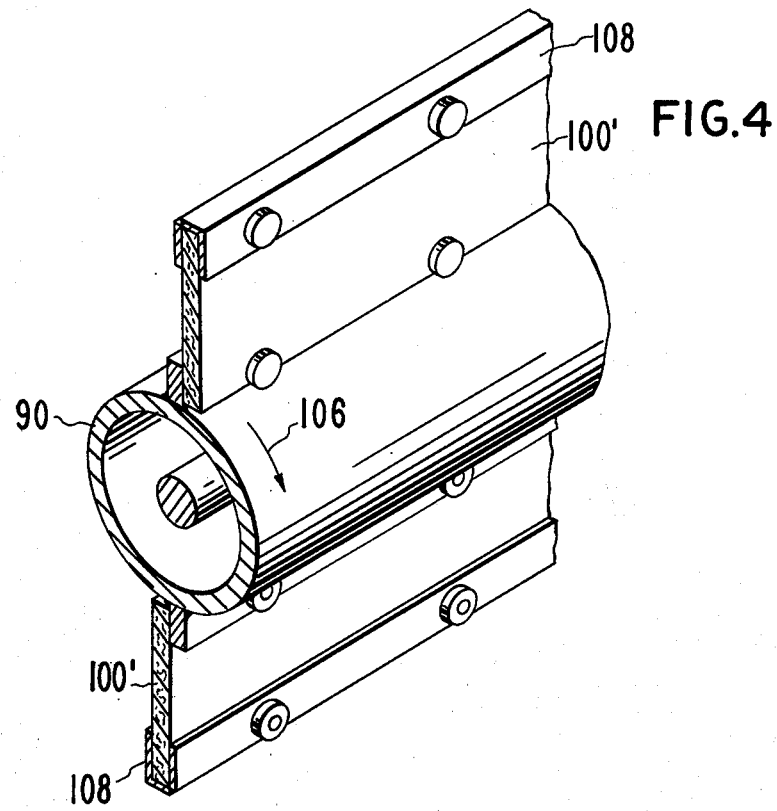
FIG. 4 is a perspective side cross-sectional view similar to FIG. 3 but illustrating an alternate embodiment of the earth cudgeler assembly.

An alternate embodiment of cudgeler assembly 76 is illustrated in FIG. 4. Cudgelers 100' are shaped in the form of paddles 107 mounted peripherally on shaft 90 extending axially the width of scoop bucket 75. As previously described, shaft 90 is rotated in the direction of arrow 106 by attached belt drive pulley 95. Cudgelers 100' are thick elastic members constructed from rubber fabric and the like and are both mounted on shaft 90. A steel tip 108 can be mounted to the furtherest radial extension of the cudgelers 100' for maximum soil impact and reduced wear.

On the open trailing portion 79 of scoop bucket 75 there is mounted an elastic gate 109. This elastic gate 109 is yieldably mounted on gate bar 110 which extends the width of scoop bucket 75 immediately over open trailing portion 79. This elastic gate 109 prevents the cudgelers 100 from impelling small pieces of soil exteriorly of the scoop bucket 75 in a manner which may be unsafe, and controllably releases the processed soil interiorly of the scoop bucket as the weight of the processed earth builds up against elastic gate 109.

Hollow steel roller 116 is attached to the extremity of frame 14 rotatably mounted on roller pinions 30 suspended between spars 29. Roller 116 may be internally filled with a ballast, such as water, sand, and the like, to both weight frame 14 and provide the desired compressing of soil layer 24.

Immediately on scarifier 16, a vibration generator 120 is fixedly mounted. Hydraulic lines 122 supply the necessary power to vibrator 120. In operation, vibrator 120 generates vibration energy on scarifier assembly 16 and transmits vibrational energy to fragmentation assembly 18 through the mechanical attachment to frame 14. The generator, thus, transmits minute vibrational motion to the earth-working surfaces assuring their constant kinetic frictional union with the passing soil. Additionally, this minute vibrational motion, when transmitted to the soil, will promote the desired homogeneous mixture of the processed soil layers.

In operation, the disclosed invention is towed over soil layer 24 by a tractor attached to frame 14 at hitch 20. Scarifier assembly 60 is rotated into earth-engaging relationship by scarifier pistons 67 as hereinbefore described. Teeth 44 of the scarifier come into contact with compacted layer 24, disengaging the layer angularly upward along the surface of teeth 44 in large clods. These clods, after passing through scarifier assembly 16, are impelled onto moldboard 84. As frame 14 is drawn forward, the bulk of clods impelled onto moldboard 84 traverse its inclined surface into the confined interior of scoop bucket 75 where their weight ballasts frame 14 against any upwards reaction of scarifier 16 transmitted to the frame. Engine 98 rotates shaft 90 through belt 96 driving pulley 95. Shaft 90 rotates in the direction of arrow 106 causing cudgelers 100 to impact the disengaged clods between the cudgelers and bottom 80 of scoop bucket assembly 75. Cudgeler assembly 76 is rotated in the direction of arrow 106 to impel the disengaged soil from open leading portion 78 to open trailing portion 79. The impelled soil accumulates at the open trailing portion 79 against elastic gate 109. This accumulation arrests the passage of the soil interiorly of scoop bucket 75 to enable cudgeler assembly 76 to thoroughly fragmentize the passing earth. When the accumulation against elastic gate 109 is sufficient, the gate will yieldably bend about gate bar 110 allowing the soil to exit scoop bucket 75 at open trailing portion 79. Immediately after exiting the scoop bucket, the processed soil is compressed by frame-mounted roller 116 in a level agricultural bed suitable for immediate planting.

Internally of scoop bucket 75 on bottom 80 directly under rotatable shaft 90, there is mounted a step 124. This step 124 defines the minimum clearance between bottom 80 and cudgeler assembly 76. Soil passing interior of the scoop bucket is impelled inward along the inclined surface of step 124 into the path of the rotating cudgelers 100. Additionally, step 124 restricts the non-fragmentized passage of large masses of compacted earth.

As is common, hitch 20 may be connected to a tractor having a pulling attachment which is vertically adjustable with respect to soil layer 24. Such an adjustment would vary the height of the forward end of frame 14 with respect to soil layer 24. Tires 32 attached to the rearward extremity of frame 14 at spars 29 provide the same elevating adjustment at the rear portion of the frame. Tire adjustment cylinders 36 are shown in FIG. 2 in a retracted attitude. By supplying hydraulic energy to cylinders 36, plungers 37 move arms 33 rotatably connected to spars 29 at pivots 35 and rotating tires 32 arcuately underneath frame 14. This arcuate rotation of tires 32 on arms 33 elevates frame 14 with respect to layer 24, thus changing the elevation of the rear extremity of the frame. As is apparent, either side of frame 14 may be selectively elevated moving all the attached earth-working assemblies of frame 14 in and out of their earth-working relationship with layer 24 thus providing optimum adjustment of the described earth-working assemblies.

Scarifier assembly 16 has been described as adjustable with respect to frame 14 by the operation of scarifier piston 67. Piston 67 may serve the dual purpose of providing a shock absorbing adjustment for the scarifier in the likely event that rocks are encountered during the plowing operation. When rocks are encountered in soil layer 24, if scarifier 16 is fixedly held against the surface of the earth, the teeth 44 or their attached shanks 46 will break and deform upon impact. Accordingly, a vent 129 is provided to scarifier piston 67. Scarifier 16, upon being impaled upon a rock, will transmit an abnormal rotational force through fulcrums 57 and 62. This force will be mechanically transmitted to pistons 67 through connecting rod 73, lever rod connecting bar 71, fulcrum axle 65 and fulcrum 62. An abnormally large hydraulic pressure interiorly of scarifier piston 67 will be relieved by vent 129, causing scarifier assembly 16 to rotate away from rocks in the soil layer upon impact, thereby preserving the advancing scarifier from destruction.

Immediately behind engine 98 on the upper extremity of frame 14 there is mounted a soil additive hopper 136. Overlying the forward portion of cudgeler 76, a hopper valve 137 is installed at the lower portion of hopper 136. In operation, valve 137 controllably releases soil additives into rotating cudgeler assembly 76 as it impacts soil interior of scoop bucket 75. As the soil is fragmentized, a homogeneous dispersion of the soil additives throughout the processed earth takes place.

The combination deep earth-working plow and fragmentation apparatus has been here shown with an attached engine 98 supplying the necessary power for cudgeler assembly 76 and vibrator 120. As should readily be apparent, various power devices, such as hydraulic motors, electric motors, and the like, may power the cudgeler assembly 76 and vibrator 120. Further, tire adjustment cylinder 36, and scarifier piston 67 have been illustrated as hydraulically powered units. These hydraulic pistons may, of course, be substituted with other mechanical expedients such as worm cams and followers which are well-known in the art.

The deep earth-working plow has been shown with a vibration generator 120 attached thereto. An additional source of vibration may be obtained by attaching an eccentric weight 140 to rotatable shaft 90 as illustrated in FIG. 1. This eccentric weight 140 effectively moves the center of gravity of shaft 90 a distance radially outward from its axis of rotation. When shaft 90 is rapidly rotated, the inertial forces acting on the shaft will try to rotate the shaft about its new center of gravity. Bearings 92 will restrict the shaft in such rotation about its original axis of rotation. The result of these two opposing forces will be a minute vibrational motion transmitted to the scoop bucket 75 through bearings 92. The shaft, in effect, becomes a frame mounted vibration generator similar to vibration generator 120 and can be utilized similar to the vibration generator to superimpose vibrational motion upon the earth-working conveyance of both the scarifier assembly 16 and the earth fragmentation assembly 18.

Although the foregoing invention has been described in some detail by way of illustration and example for purposes of clarity and understanding, it is understood that certain changes and modifications may be practiced within the spirit of the invention as limited only by the scope of the appended claims.

What is claimed:

1. A deep earth-working combination plow and fragmentation apparatus for the single-pass processing of compacting soil layers, said apparatus comprising: a frame suitable for moving a plurality of earth-processing assemblies in earth-working relationship with said soil layers; a scarifier assembly mounted to said frame for disengaging compacted soil; an earth fragmentation assembly mounted to said frame immediately behind said scarifier assembly; said fragmentation assembly comprising, a scoop bucket assembly having an open leading portion and an open trailing portion provided with a yieldable closure, said open leading portion for gathering said disengaged compacted soil, said trailing portion for discharging soil when said closure is open, said scoop bucket assembly having a fixed bottom with attached walls at either side thereof, said walls fixedly connecting said bottom to said frame, said trailing portion being at the rear of said bottom and being spaced above the ground, said closure having a lower margin terminating substantially at said bottom, there being a moldboard attached to said leading portion at said bottom, said moldboard extending angularly forwardly of said leading portion and extending rearwardly and upwardly to a position directly over a forward portion of said fixed bottom for directing disengaged, compacted soil layers interiorly of said scoop bucket as said frame is moved during said single pass, a single rotatable shaft mounted to said scoop bucket above said bottom and spanning said walls, a plurality of earth cudgelers, said cudgelers being mounted on the diameter of said shaft and extending outward therefrom, said bottom having means rearwardly of said forward portion and generally vertically aligned with and spaced below said cudgelers for elevating said disengaged compacted soil toward said cudgelers, said cudgelers being operable to impel the disengaged compacted soil rearwardly against said closure, whereby sufficient accumulation of said soil will cause the closure to open and the soil to be discharged from said bucket assembly and to fall to the ground, said rotatable shaft being mounted at sufficient height from said bottom for having said cudgelers contact said gathered and disengaged compacted soil; and means for rotating said shaft and attached cudgelers in a direction to cause the cudgelers to direct the soil rearwardly toward said closure, said fixed bottom being the sole means for supporting the gathered and disengaged compacted soil in the scoop bucket assembly rearwardly of the moldboard and below the cudgelers whereby said impelled disengaged soil interiorly of said scoop bucket is fragmentized by said rotating cudgelers before being discharged.

2. A deep earth-working combination plow and fragmentation apparatus for the single-pass processing of compacted soil layers, said apparatus comprising: a frame suitable for moving a plurality of earth-processing assemblies in earth-working relationship with said soil layers; a scarifier assembly mounted to said frame for disengaging compacted soil; said scarifier assembly comprising, a scarifier yoke, shanks mounted fixedly to said scarifier yoke and extending substantially vertically down from said yoke, teeth affixed to the lower extremity of said shanks, said teeth being mounted so as to be between said shank and said soil layer during said single pass, said teeth obtusely inclined with respect to said soil layer for disengaging said soil layers angularly upward along said teeth during said single pass; an earth fragmentation assembly mounted to said frame immediately behind said scarifier assembly comprising, a scoop bucket assembly having an open leading portion and an open trailing portion, said open leading portion for gathering said disengaged compacted soil, said open trailing portion for discharging said soil, there being an elastic gate normally closing the open trailing portion, the lower margin of the open trailing portion being spaced above the ground, said scoop bucket assembly having a fixed bottom with walls attached at either side thereof, said walls fixedly connecting said bottom to said frame, a moldboard attached to said leading portion at said bottom, said moldboard extending angularly forward of said leading portion for impelling disengaged, compacted soil layers interiorly of said scoop bucket as said frame is moved during said single pass, a rotatable shaft mounted to said scoop bucket, said rotatable shaft extending the width of said scoop bucket spanning said walls, a plurality of earth cudgelers, said cudgelers being mounted on the diameter of said shaft extending radially outward therefrom, said cudgelers comprise short individual arms mounted on the diameter of said shaft and extending radially outward therefrom, said individual arms each extending less than the axial width of said shaft interiorly of said scoop bucket assembly, said rotatable shaft being mounted at sufficient height from said bottom for having said cudgelers contact and rearwardly impel said gathered and disengaged compacted soil, means for rotating said shaft and attached cudgelers whereby said impelled soil interiorly of said scoop bucket is fragmentized by said rotating cudgelers before being discharged, said fixed bottom being the sole means for supporting the gathered and disengaged compacted soil in the scoop bucket rearwardly of the moldboard and below the cudgelers, an elevated step defined in said bottom, the upper edge of said step being generally vertically aligned with and spaced below said shaft to define the minimum clearance between said bottom and said shaft, said step inclined upwardly toward said cudgelers for impelling said disengaged compacted soil layers interiorly of said scoop bucket into said cudgelers; a hollow steel ground-engaging roller rotatably mounted to said frame behind said scoop bucket assembly; said roller extending axially the width of said scoop bucket assembly; said roller rotatably mounted to said frame at an elevation for compressing said discharged soil from said scoop bucket assembly.

* * * * *